(12) United States Patent
Singh et al.

(10) Patent No.: US 9,853,772 B2
(45) Date of Patent: Dec. 26, 2017

(54) INTELLIGENT NETWORK CHECKSUM PROCESSING

(71) Applicant: Dell Products L.P., Round Rock, TX (US)

(72) Inventors: Ankit Singh, Bangalore (IN); Rohit Kumar Arehalli, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 11 days.

(21) Appl. No.: 15/051,495

(22) Filed: Feb. 23, 2016

(65) Prior Publication Data
US 2017/0244518 A1  Aug. 24, 2017

(51) Int. Cl.
  *G06F 11/10* (2006.01)
  *H03M 13/00* (2006.01)
  *H04L 1/00* (2006.01)

(52) U.S. Cl.
  CPC ........ *H04L 1/0061* (2013.01); *G06F 11/1004* (2013.01); *H04L 1/0045* (2013.01)

(58) Field of Classification Search
  CPC ... H04L 1/0061; H04L 1/0045; H04L 1/0051; H04L 1/20; H04L 1/0066; H04L 1/0053; H04L 29/06; H04L 69/165; H04L 69/10; H04L 69/161; H04L 69/16; G06F 11/1004
  See application file for complete search history.

(56) References Cited

U.S. PATENT DOCUMENTS

| | | | |
|---|---|---|---|
| 7,020,079 B2 * | 3/2006 | Chu | H04L 29/06 370/225 |
| 7,219,294 B2 | 5/2007 | Vogt | |
| 7,577,899 B2 | 8/2009 | Nieto et al. | |
| 7,840,873 B2 | 11/2010 | Hughes et al. | |
| 2014/0053049 A1 * | 2/2014 | Chen | H04L 1/0051 714/807 |

\* cited by examiner

*Primary Examiner* — Guerrier Merant
(74) *Attorney, Agent, or Firm* — Baker Botts L.L.P.

(57) ABSTRACT

Methods and systems for intelligent network checksum processing are disclosed. A method for intelligent network checksum processing may include receiving a data unit at a receiver network element sent from a sender network element, determining a success count of the sender network element, determining whether to perform a checksum validation at the receiver network element, wherein the determining may include skipping the checksum validation if the success count of the sender network element is greater than the predefined threshold success count, and performing the checksum validation if the success count of the sender network element is not greater than a predefined threshold success count, incrementing the success count of the sender network element if the checksum validation is performed and the checksum validation is successful, and resetting the success count of the sender network element if the checksum validation is performed and the checksum validation is unsuccessful.

21 Claims, 2 Drawing Sheets

INTELLIGENT NETWORK CHECKSUM PROCESSING

TECHNICAL FIELD

This disclosure relates generally to information handling systems and more particularly to a system and method for intelligent network checksum processing.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and/or networking systems.

An information handling system, may communicate with another information handling system according to a suitable communications protocol, such as the Transmission Control Protocol/Internet Protocol (TCP/IP) communications protocol. The increasingly larger bandwidth that is available on networks has created processing bottlenecks at individual network elements comprising the network caused in part by communications protocol processing. Thus, although a communication network may be able to transport data according to the available bandwidth of the communications network, one or more of the network elements may limit the network throughput based on the availability of resources at the network element for communications protocol processing. That is, if the network element cannot process the data of the communications stream as quickly as it arrives, the network throughput may suffer.

SUMMARY

In accordance with some embodiments of the present disclosure, a method for intelligent network checksum processing includes receiving a data unit at a receiver network element sent from a sender network element. The method may also include determining a success count of the sender network element. The method may further include determining whether to perform a checksum validation at the receiver network element, wherein the determining may include skipping the checksum validation if the success count of the sender network element is greater than the predefined threshold success count, and performing the checksum validation if the success count of the sender network element is not greater than a predefined threshold success count. The method may also include incrementing the success count of the sender network element if the checksum validation is performed and the checksum validation is successful. In addition, the method may further include resetting the success count of the sender network element if the checksum validation is performed and the checksum validation is unsuccessful Other disclosed aspects include non-transitory computer readable medium comprising computer readable instructions executed by a processor, and a network element having access to a processor and a memory including computer readable instructions executed by the processor.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
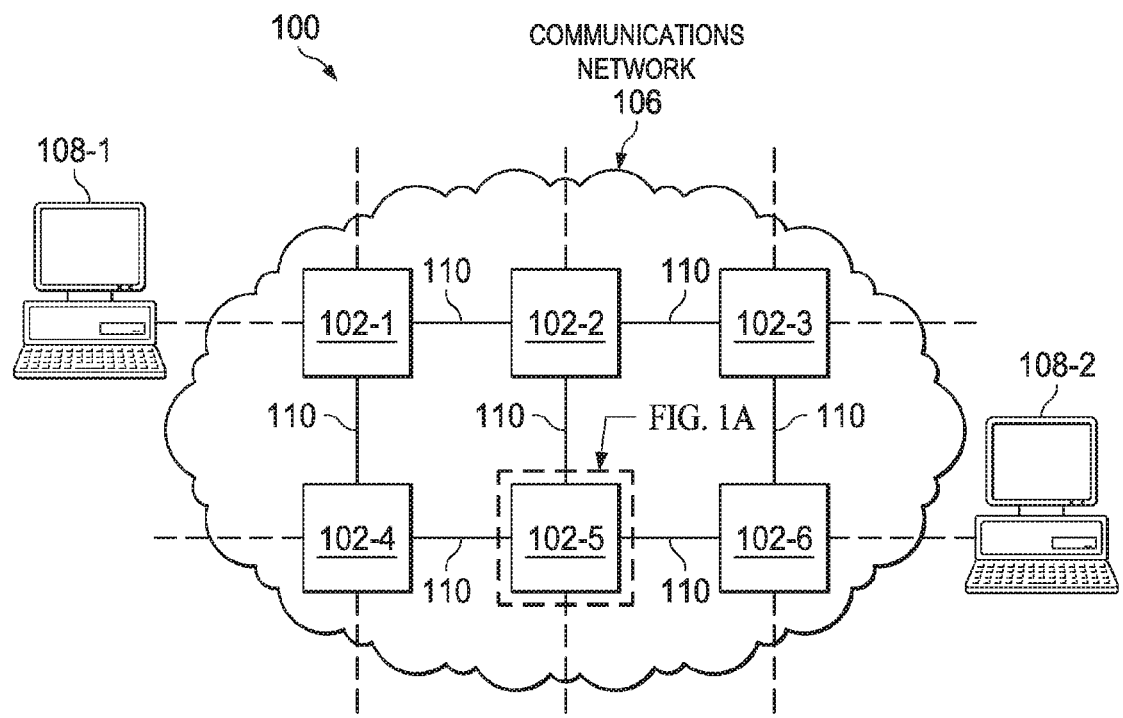
FIG. 1 illustrates a block diagram of selected elements of an embodiment of a network according to the present disclosure.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

As discussed above, network throughput may be limited by communications protocol processing at the individual network elements comprising the network. For example, data units representing network data may pass between network elements within a communications network. These data units may require processing consistent with one or more communication protocols. One component of such processing may be checksum validation used to detect data unit corruption. Data unit corruption may be caused by unreliable connections or "links" between network elements or other noise in the network that results in the contents of the data unit unexpectedly changing (e.g., dropped or flipped bits) as the data unit travels through the network. Unexpected changes to the contents of one or more data units may result in network inefficiencies and/or reliability issues. Detecting data unit corruption may require resources, including for example, resources of the network elements performing the communications processing. As the number of data units arriving at a particular network element increases, the data units may experience transmission delays while the data units are processed and while the data unit waits for available resources for performing the communications protocol processing. In this manner, network bottlenecks may form at one or more network elements, causing transmission delays which may result in network delays and/or reduced network throughput.

As will be described in further detail below, the inventors of the present disclosure have discovered methods and systems for intelligently performing checksum validation, such that communications protocols processing may be reduced to improve network throughput. The methods and systems monitor the reliability of links between various network elements in order to identify which connections are reliable, less likely to suffer from data unit corruption. Once a link between two network elements is deemed reliable or "noise free," certain communications protocol processing steps, such as checksum validation, between these network elements may be skipped, thus decreasing the amount of processing required. Network throughput may increase as the communications protocol processing decreases, thereby avoiding unwanted transmission delays for data units.

Figure 2:
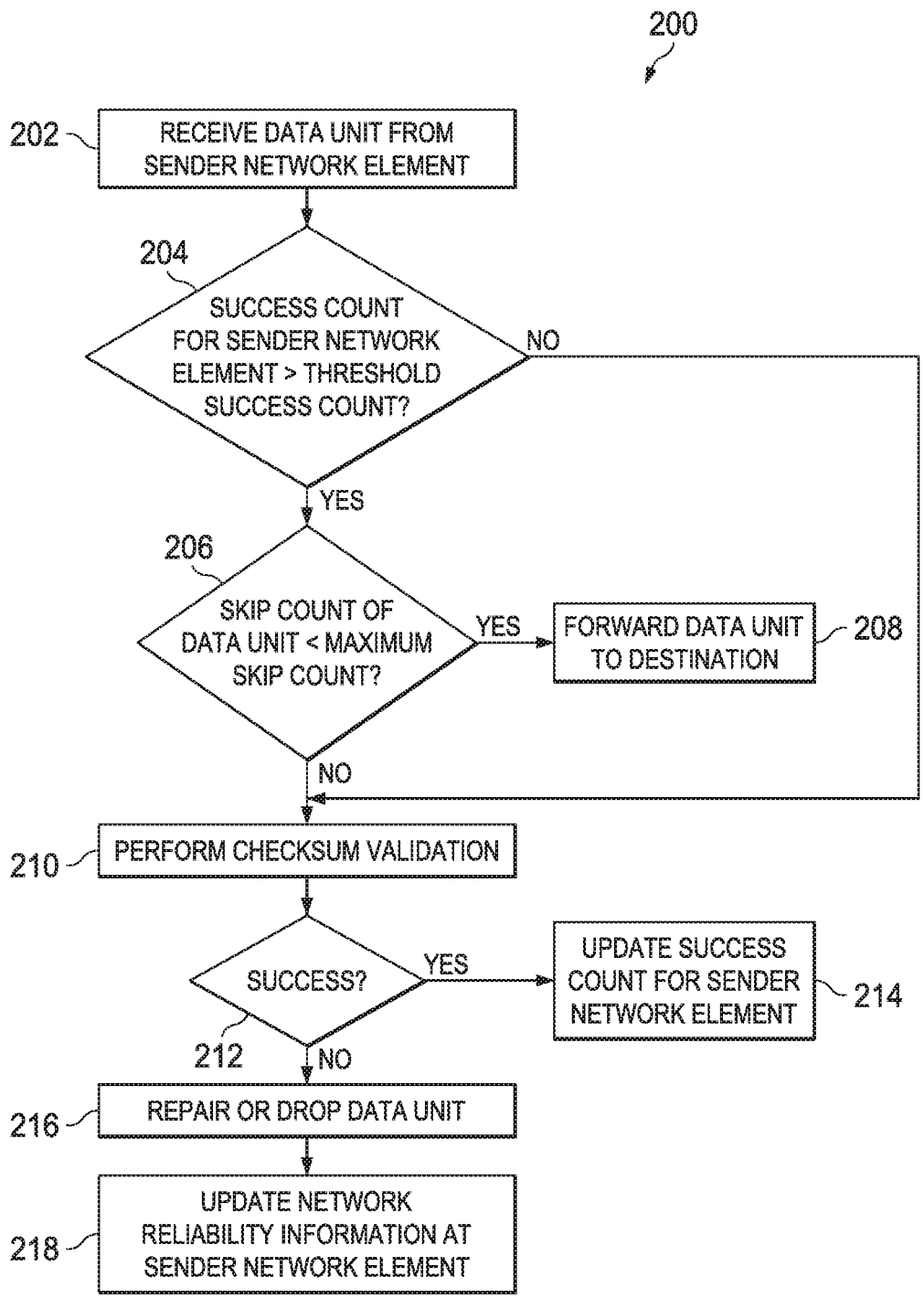
FIG. 2 illustrates an example method for optimizing network throughput.

Particular embodiments are best understood by reference to FIGS. 1-2 wherein like numbers are used to indicate like and corresponding parts.

FIG. 1 illustrates a block diagram of selected elements of an embodiment of a network according to the present disclosure. In some embodiments, network 100 may include one or more host elements 108 communicatively coupled through communications network 106. That is, communications network 106 may be configured to send and receive information between the various host elements 108.

To send and receive information via communications network 106, host elements 108 may be communicatively coupled to one or more network elements 102 within communications network 106. For example, as illustrated, host element 108-1 may communicatively couple to communications network 106 via network element 102-1, and host element 108-2 may communicatively couple to communications network 106 via network element 102-6. As discussed in more detail below, network elements 102 may be any suitable system operable to transmit and receive network data. Although not illustrated, in some embodiments, host elements 108 may communicatively couple to one or more other network elements and/or networks. In certain embodiments, host elements 108 may communicatively couple to communications network 106 via other networks, including, for example, local area networks that are themselves communicatively coupled to communications network 106.

Although illustrated as desktop computer systems, host elements 108 may be any information handling system or any device capable of network communication. For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Communications network 106 may permit communication between host elements 108 or other devices. Communications network 106 may include one or more transmission media 110 operable to transport one or more signals between the various network elements 102 and/or any other elements within or communicatively coupled to communications network 106. As illustrated in FIG. 1, communications network 106 may include one or more network elements 102 communicatively coupled together by one or more transmission media 110. In the illustrated communications network 106, network elements 102-1 through 102-6 are shown in a mesh configuration, however, any suitable configuration and any suitable number of network elements 102 may create communications network 106. Examples of alternative network configurations may include but are not limited to a ring network, a point-to-point network, or another suitable arrangement. In some embodiments, communications network 106 may be a local-area network, personal-area network, metropolitan-area network, wide-area network, short-haul network, long-haul network, and/or a combination or component thereof.

Information may travel between network elements 102 over transmission media 12. In some embodiments, transmission medium 12 may include any system, device, or apparatus configured to communicatively couple network elements 102 to each other such that network elements 102 may communicate information to and from each other or other elements. For example, transmission medium 12 may include optical fiber, Ethernet cable, T1 cable, Wi-Fi or Bluetooth connection, and/or any other suitable media for communicating information, including any suitable wired or wireless technologies. In some embodiments, communications network 106 may use one or more different forms of transmission media.

Network elements 102 may comprise any suitable system operable to transmit and receive information. For example, network elements 102 may be a hub, router, switch, bridge, information handling system, or any other system or device operable to transmit and receive network data. In the illustrated embodiment, each network element 102 may be operable to transmit network data directly to one or more other network elements 102 and receive network data directly from one or more other network elements 102 via one or more transmission media 12. Network elements 102 may also be able to indirectly communicate with other network elements 102 through other devices, such as intermediary network elements 102.

Using transmission media 12 and network elements 102, communications network 106 may communicate information or network data across the network. As used herein, network data means information transmitted, stored, or sorted in communications network 106. Network data may comprise optical or electrical signals configured to encode audio, video, textual, and/or any other suitable data. Network data may be transmitted in a synchronous or asynchronous manner, and may be transmitted deterministically (also referred to as 'real-time') and/or stochastically. In some embodiments, network data may be communicated via a communications protocol. For example, network data may be communicated with a protocol operating within the Open Systems Interconnection (OSI) model (e.g., as defined by the ISO/IEC 7498-1 standard). In some embodiments, network data may be communicated with the transmission control protocol and/or the Internet protocol, sometimes referred to as the Internet protocol suite or TCP/IP. Additionally, network data communicated via communications network 106 may be structured in any appropriate manner including, but not limited to, frames, packets, and/or segments. The term data unit used herein is not limiting, and may refer to frames, packets, segments, and/or any other formatted unit of data.

Information communicated via communications network 106 may be communicated in the form of data units transported individually across the network. For example, network data (e.g., audio, video, textual, or any other data) sent from host elements 108-1 to host element 108-2 may be split into individual data units or "chunks" for transportation across communications network 106. A data unit may contain header information in addition to the unit of data to be transported. In some embodiments, the header information of the data unit may include the source of the data unit, the destination of the data unit, offset information, flags, and/or any other information that may assist in the transportation of the data unit. In some embodiments, the header may also include a checksum field capable of storing an expected checksum value for the purposes of error checking the data unit.

As explained above, network elements may implement checks to detect data unit corruption and ensure the integrity data units traveling within communications network 106. For example, a network element 102 receiving a data unit may validate that the header and/or data portion of the data unit have not been corrupted as the data unit traveled through communications network 106. In some embodiments, network element 102 may perform a checksum validation on the data unit to detect corruption. Checksum validation may be performed in any suitable manner, including by hardware, software, or a combination thereof. In certain embodiments, a network element may calculate a checksum value for a certain portion of the data unit (e.g., some or all of the information comprising the header, data, and/or both), and then compare the calculated checksum value to an expected checksum value. In some embodiments, the expected checksum value may be stored in the data unit, including for example, in the header portion of the data unit. By comparing the calculated checksum value to the expected checksum value, network element 102 may detect that certain data within the data unit has changed from when the expected checksum value was previously calculated, which in some circumstances, could indicate data unit corruption. In certain embodiments, network element 102 may repair or discard the data unit upon detecting data unit corruption so that the corrupted data unit does not continue to propagate through communications network 106. Upon performing checksum validation, network element 102 may in some embodiments also update one or more fields or data (e.g., time to live, counter, timestamp) within the data unit. In certain embodiments, network element 102 may recalculate or otherwise update the expected checksum value to reflect any changes made to the data unit before sending the data unit to other network elements within communications network 106.

In certain embodiments, checksum validation may be conducted at network elements 102 receiving data units in the network. For example, a data unit sent from host element 108-1 may travel between multiple network elements 102 of communications network 106 before reaching its final destination at host element 108-2. An exemplary path for a data unit sent from host element 108-1 (e.g., source of the data unit) to host element 108-2 (e.g., destination of the data unit) in communications network 106 includes but is not limited to: host element 108-1→network element 102-1→network element 102-4→network element 102-5→network element 102-6→host element 108-2. A data unit may use any combination of network elements 102, and the particular path of a data unit may be determined based on availability, bandwidth, reliability, or any other factors associated with the network and/or host elements of the network. In some embodiments, each network element 102 in the path from the source to the destination (e.g., host element 108-1 to host element 108-2, or vice-versa) may implement checksum validation in accordance with one or more communication protocols as discussed above to detect data corruption and ensure the integrity the data unit. In some embodiments, the checksum validation may be performed at network element 102 after the data unit is received and before the data unit is propagated out to other network elements 102. In some scenarios, checksum validation at network element 102 may delay outgoing data units, thereby creating a network bottleneck in communications network 106. For example, network throughput may decrease as the number of data units arriving at a network element 102 increases, consuming more resources of network element 102 with communications protocol processing. With fewer available resources at network element 102, the processing of incoming data units may be delayed, and in some instances, data units may wait (e.g., in a receiving queue) until resources are available for performing communications protocol processing.

To improve network throughput, checksum validation of a data unit may be skipped at certain network elements 102, thereby reducing the amount of processing performed at one or more network elements 102. For example, when network links communicatively coupling network elements 102 are determined to be of a certain reliability, network elements 102 may skip checksum validation for data units on this reliable link because the risk of data unit corruption may be particularly low. To illustrate, if data units received at a particular network element 102 (e.g., network element 102-5) from another network element 102 (e.g., network element 102-4) are consistently determined to be uncorrupted or otherwise "clean," then the link between network elements 102-4 and 102-5 may be deemed reliable or "noise free." In some embodiments, the sending and/or receiving of uncorrupted data units between two or more network elements 102 may indicate a reliable link between the network elements 102, such that checksum validation may intelligently be skipped because of a reduced risk of data unit corruption. Reducing the processing at one or more network elements 102 may improve the overall network throughput.

Figure 1A:
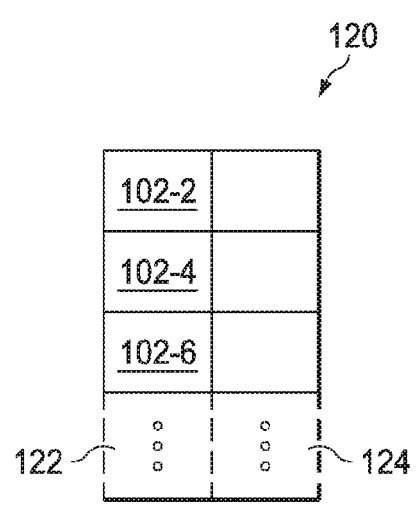
FIG. 1A illustrates an exemplary table for monitoring network links.

In some embodiments, network elements 102 may monitor the connections or links with other network elements 102 in order to determine the reliability of a particular link. For example, FIG. 1A illustrates an exemplary table for monitoring network links. In some embodiments, network reliability table 120 may contain network element column 122 and success count column 124. In certain embodiments, each network element 102 may maintain a network reliability table 120 to monitor connecting links with other network elements 102. In some embodiments, network element column 122 may contain an entry for each network element 102 communicatively coupled to the particular network element 102. For the purposes of illustration, network reliability table 120 in FIG. 1A may correspond to network element 102-5, although each network element 102 may have an associated reliability table 120. Network element column 122 may contain an entry for network elements 102-2, 102-4, and 102-6, each network element 102 that is communicatively coupled to network element 102-5. Network reliability table 120 may be maintained and/or implemented in software or hardware within network element 102 or any other information handling system communicatively coupled to network element 102.

Network elements 102 may update network reliability table 120 based on the data units received from other network elements. In some embodiments, upon a successful checksum validation of a data unit received from another network element 102, network element 102 may increment success count column 124 for the particular network element 102 from which the data unit was received. For example, a data unit received from network element 102-4, may result in an increment to success count column 124 for network element 102-4 in the network reliability table 120 for network element 102-5. In some embodiments, success count column 124 may be reset (e.g., reduced in value and/or set to zero) for a particular network element 102 upon an unsuccessful checksum validation. By maintaining network reliability table 120, each network element 102 may monitor the frequency of data unit corruption of data received from other network elements 102.

Network reliability table 120 may be used to intelligently reduce checksum validation by assuming no data unit corruption for data units arriving via reliable network links. In some embodiments, when the number in success count column 124 reaches a predefined threshold success count (e.g., 10), network element 102-5 may determine that a particular link with another network element 102 for which the entry relates has a reliable, noise free link. In certain embodiments, checksum validation for subsequent data units received at network element 102-5 from the corresponding network element 102 via this link may be skipped because the risk of data unit corruption is low based in part on the on previous uncorrupted data units arriving via this link. As an example, after network element 102-5 receives a number (e.g., predefined threshold success count) of uncorrupted data units from network element 102-4, network element 102-5 may skip checksum validation for each subsequent data unit received from network element 102-4 so long as the number in success count column 124 remains at or above the predefined threshold success count.

In some embodiments, communications network 106 may proactively revert to performing checksum validation upon detection of changed circumstances in the network. Receiving a corrupted data unit at a network element 102 may indicate an unreliable link with the network element from which the data unit was received, or in some scenarios, an unreliable link of another network element 102 earlier in the travel path of the data unit. Thus, it may also be desirable in embodiments to update reliability information at one or more other network elements in addition to network element 102 where data unit corruption was detected. To this end, in certain embodiments, a failed checksum validation at a network element 102 may result in notification of the corruption to other network elements 102. For example, a corrupted data unit received at network element 102-5 may correspond with an unreliable link with the sending network element, e.g., network element 102-4. In some embodiments, network element 102-5 may notify network element 102-4 of the corrupted data unit so that network element 102-4 may update its own network reliability table 120. Upon receiving notice of the data unit corruption at network element 102-5, network element 102-4 may reset (e.g., reduce in value and/or set to zero) success count column 124 for network element 102-1, the network element from which the corrupted data unit was sent to network element 102-4. In some embodiments, network element 102-4 may identify network element 102-1 as the sender of the corrupted data unit based on the contents of the notice received from network element 102-5. In certain embodiments, network element 102-4 may maintain a history of data units received in order to facilitate identification of which network element sent the corrupted data unit. In some embodiments, network element 102-4 may identify network element 102-1 as the sender by accessing a list of route paths through network 106, in for example, the same manner used to send acknowledgment packets when a data unit from the receiving network element to the sender network element.

In sum, if data unit corruption occurs, one or more of the network elements in the data unit's path may also update their network reliability table 120. Through updates to network reliability tables 120, communications network 106 may control when and if checksum validation performed, which may enable earlier detection of data unit corruption.

In some embodiments, communications network 106 may monitor the number of times a data unit skips checksum validation. As explained earlier, a network element 102 may skip checksum validation on a data unit based on network reliability table 120. In some embodiments, if network element 102 does not perform checksum validation on a data unit, then a skip tracker variable (e.g., counter, timestamp) for that particular data unit may be updated to reflect that checksum validation was skipped. For example, a counter (e.g., skip tracker variable) associated with the data unit may be incremented if network element 102 skips checksum validation. In certain embodiments, the skip tracker variable may be stored or contained in the data unit. As an example, the skip tracker variable may be part of a header or data in the data unit. In certain embodiments, the skip tracker variable may be part of the TCP header.

In order to control the frequency with which any one data unit undergoes checksum validation, communications network 106 may limit the number of skips for a data unit. By monitoring and limiting the number of skips for each data unit, communications network 106 may ensure that checksum validation is performed at a minimum frequency for any particular data unit. In some embodiments, communications network 106 may set a maximum skip count (e.g., 10), representing the maximum number of times that a data unit may skip checksum validation. If a data unit reaches the max skip count, then communications network 106 may require that checksum validation be performed on that data unit regardless of the count in reliability table 120 for the network element 102 from which the data unit was sent. In some embodiments, communications network 106 may limit the total number of skips for a data unit, and in other embodiments, communications network 106 may limit the number of consecutive skips for a data unit. As an example, network element 102-5 may receive a data unit from network element 102-4. The data unit may have a skip tracker variable (e.g., 11) that exceeds maximum skip count (e.g., 10), indicating that the data unit has exceeded the maximum allowed skips, and that checksum validation must be performed on the data unit. In some embodiments, network element 102-5 may perform checksum validation on the data unit, even if network reliability table 120 indicates that checksum validation may be skipped.

In some embodiments, a data unit may be updated following a checksum validation. For example, in certain embodiments, the skip tracker variable of the data unit may be updated (e.g., decremented or reset) to reflect that checksum validation was performed on the data unit. Updating the skip tracker variable may allow the data unit to resume skipping checksum validation in the manner described earlier. In certain embodiments, a time to live indication in the data unit may be updated (e.g., decremented or reset) when checksum validation occurs. In some networks, time to live may limit the lifespan or lifetime of data unit in the network, preventing a data unit from circulating in the network indefinitely. Because the time to live of a data unit may not be updated when checksum validation is skipped, it may be updated when checksum validation is resumed for a data unit. In some embodiments, the time to live of the data unit may be updated to reflect the total number of skips that the data unit has made (e.g., skip tracker variable). For example, the time to live of a data unit may be decremented by skip tracker variable when checksum validation is performed on data unit. In some embodiments, the expected checksum value for the data unit may be updated to reflect any modified or added data to the data unit. Although skip tracker variable, time to live, and expected checksum value have been discussed, any other data in a header or body of a data unit may also be updated when checksum validation is performed.

Modifications, additions, or omissions may be made to network 100 and communications network 106 without departing from the scope of the disclosure. The components and elements of network 100 and communications network 106 may be integrated or separated according to particular needs. Moreover, the operations of network 100 and communications network 106 may be performed by more, fewer, or other components. For example, in some embodiments, host elements 108 may couple to two or more networks. In some embodiments, communications network 106 may service a plurality of host elements 108 and other networks not explicitly illustrated.

FIG. 2 illustrates an example method 200 for optimizing network throughput, in accordance with some embodiments of the present disclosure. Method 200 may begin at step 202, where a data unit is received from a sender network element at a receiver network element. The data unit may represent information communicated over a communications network, such as information from one host element sent to another host element, as discussed in reference to FIG. 1.

In step 204, method 200 determines whether success count for the sender network element is greater than a threshold success count. In some embodiments, the receiver network element may maintain a network reliability table as discussed in reference to FIGS. 1 and 1A to monitor the reliability of links with neighboring network elements. For example, the receiver network element may access the success count column of the network reliability table to determine the number of uncorrupted data units received from the sender network element. If the number of successful data units received from the sender network element is greater than the threshold success count (e.g., 10), then it may reflect a reliable or noise free link between the sender and receiver network elements such that the risk of data unit corruption is low. If the requested success count for the sender network element is greater than the threshold success count, method 200 proceeds to step 206.

In step 206, method 200 determines whether the skip count of the data unit is less than the permitted maximum skip count. In some embodiments, each data unit may monitor (e.g., using skip tracker variable discussed in reference to FIG. 1) the number of times that checksum validation is skipped for the data unit. Monitoring the skip count of each data unit may enable increased control over the reliability of the network because checksum validation of the data unit may be forced upon a determination that the data unit has skipped validation too many times (e.g., more than permitted maximum skip count). If the skip count for the data unit is below the maximum skip count permitted by the network, method proceeds to step 208.

At step 208, the data unit received from the sender network element is forwarded to its intended destination by the receiver network element without performing a checksum validation. In some embodiments, arrival at step 208 may represent the existence of a reliable link between network elements and a data unit that has not skipped checksum validation more than the permitted number of times. In such a scenario, the risk of data unit corruption may be low, such that checksum validation may be skipped with little risk of affecting the reliability of the network. In some embodiments, the skip count of the data unit may be incremented to reflect that the data unit is skipping checksum validation.

If, however, the success count for the sender network element is below the threshold success count (e.g., step 204) or the skip count of the data unit is greater than the maximum allowed skip count (e.g., step 206), method 200 proceeds to step 210. At step 210, the receiving network element may perform a checksum validation on the data unit to determine whether the data unit has been corrupted. If the outcome of the checksum validation is successful (e.g., no data unit corruption), method 200 proceeds to step 214.

In step 214, the success count of the sender network element is updated to reflect the successful checksum validation of the data unit. As described earlier, the receiver network element may maintain a network reliability table to monitor the reliability of links with neighboring network elements. In some embodiments, the receiver network element may access the success count column of the network reliability table by incrementing the number of successful data units received from the sender network element. In some embodiments, the number of successful data units received from the sender network element may be used in step 204 for determining the reliability of the link between the sender and receiver network elements. In some embodiments, the data unit may be updated after a successful checksum validation. For example, the time to live of the data unit may be updated to reflect the total number of skips that the data unit has made, as described in more detail with reference to FIG. 1.

If, however, the checksum validation performed at step 212 is unsuccessful, method 200 proceeds to step 216. At step 216, the receiver network element may repair or drop the corrupted data unit. In some embodiments, the receiver network element may repair the data unit using any appropriate means, and then forward the repaired data unit to its destination. However, not all corrupted data units may be repairable, and therefore in certain embodiments, the receiver network element may drop the data unit, or not forward the data unit to its intended destination. In some embodiments, the receiver network element may reset the success count of the sender network element in step 206 to reflect the unsuccessful checksum validation.

In step 218, the network reliability information of the sender network element is updated. For example, the receiver network element may notify the sender network element of the data unit corruption. In some embodiments, the sender network element may update its network reliability table as discussed in reference to FIGS. 1 and 1A. For example, the sender network element my reset (e.g., reduce in value and/or set to zero) its success count for the network element from which the corrupted data unit was received. In some embodiments, the sender network element may identify the network element from which the corrupted data unit was received based on the notice from the receiver network element or a log of data units received at the sender network.

Method 200 may be implemented in any suitable manner. It is noted that certain steps or operations described in method 200 may be optional or may be rearranged in different embodiments. In some embodiments, method 200 may be backward compatible with existing network methods and/or architecture. For example, some network elements within a network or another communicatively coupled network may not be configured to perform one or more of the steps described in method 200. In such a scenario, the invention described herein may nonetheless perform as intended, even if one or more of the network elements does not perform the steps of method 200.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for intelligent network checksum processing, comprising:
   receiving a data unit at a receiver network element sent from a sender network element;
   determining a success count of the sender network element;
   determining whether to perform a checksum validation at the receiver network element, wherein the determining comprises:
      skipping the checksum validation if the success count of the sender network element is greater than the predefined threshold success count; and
      performing the checksum validation if the success count of the sender network element is not greater than a predefined threshold success count;
   incrementing the success count of the sender network element if the checksum validation is performed and the checksum validation is successful; and
   resetting the success count of the sender network element if the checksum validation is performed and the checksum validation is unsuccessful.

2. The method of claim 1, wherein the success count of the sender network element is maintained at the receiver network element.

3. The method of claim 1, further comprising:
   determining a skip count for the data unit;
   performing the checksum validation if the skip count of the data unit is greater than a maximum permitted skip count regardless of the success count of the sender network element.

4. The method of claim 3, further comprising incrementing the skip count of the data unit if the checksum validation is skipped.

5. The method of claim 3, further comprising:
   decrementing a time to live count by the skip count of the data unit; and
   resetting the skip count of the data unit.

6. The method of claim 3, wherein the skip count of the data unit is maintained in a header of the data unit.

7. The method of claim 1, further comprising notifying the sender network element of an unsuccessful checksum validation.

8. At least one non-transitory computer readable medium, comprising computer readable instructions which, when executed, cause a processor to:
   receive a data unit at a receiver network element sent from a sender network element;
   determine a success count of the sender network element;
   determine whether to perform a checksum validation at the receiver network element, wherein the determination comprises:
      skip the checksum validation if the success count of the sender network element is greater than the predefined threshold success count; and
      perform the checksum validation if the success count of the sender network element is not greater than a predefined threshold success count;
   increment the success count of the sender network element if the checksum validation is performed and the checksum validation is successful; and
   reset the success count of the sender network element if the checksum validation is performed and the checksum validation is unsuccessful.

9. The non-transitory computer readable medium of claim 8, wherein the success count of the sender network element is maintained at the receiver network element.

10. The non-transitory computer readable medium of claim 8, wherein the instructions further comprise instructions to:
    determine a skip count for the data unit;
    perform the checksum validation if the skip count of the data unit is greater than a maximum permitted skip count regardless of the success count of the sender network element.

11. The non-transitory computer readable medium of claim 10, wherein the instructions further comprise instructions to increment the skip count of the data unit if the checksum validation is skipped.

12. The non-transitory computer readable medium of claim 10, wherein the instructions further comprise instructions to:
    decrement a time to live count by the skip count of the data unit; and
    reset the skip count of the data unit.

13. The non-transitory computer readable medium of claim 10, wherein the skip count of the data unit is maintained in a header of the data unit.

14. The non-transitory computer readable medium of claim 8, wherein the instructions further comprise instructions to notify the sender network element of an unsuccessful the checksum validation.

15. A network element, comprising:
  a processor;
  a memory communicatively coupled to the processor; and
  an intelligent network checksum processing module resident in the memory and including computer readable instructions which, when executed, cause the processor to:
    receive a data unit from a sender network element;
    determine a success count of the sender network element;
    determine whether to perform a checksum validation at the network element, wherein the determination comprises:
      skip the checksum validation if the success count of the sender network element is greater than the predefined threshold success count; and
      perform the checksum validation if the success count of the sender network element is not greater than a predefined threshold success count;
    increment the success count of the sender network element if the checksum validation is performed and the checksum validation is successful; and
    reset the success count of the sender network element if the checksum validation is performed and the checksum validation is unsuccessful.

16. The network element of claim 15, wherein the success count of the sender network element is maintained at the network element.

17. The network element of claim 15, wherein the instructions further comprise instructions to:
  determine a skip count for the data unit;
  perform the checksum validation if the skip count of the data unit is greater than a maximum permitted skip count regardless of the success count of the sender network element.

18. The network element of claim 17, wherein the instructions further comprise instructions to:
  decrement a time to live count by the skip count of the data unit; and
  reset the skip count of the data unit.

19. The network element of claim 17, wherein the instructions further comprise instructions to increment the skip count of the data unit if the checksum validation is skipped.

20. The network element of claim 17, wherein the skip count of the data unit is maintained in a header of the data unit.

21. The network element of claim 15, wherein the instructions further comprise instructions to notify the sender network element of an unsuccessful checksum validation.

* * * * *